Patented Oct. 3, 1922.

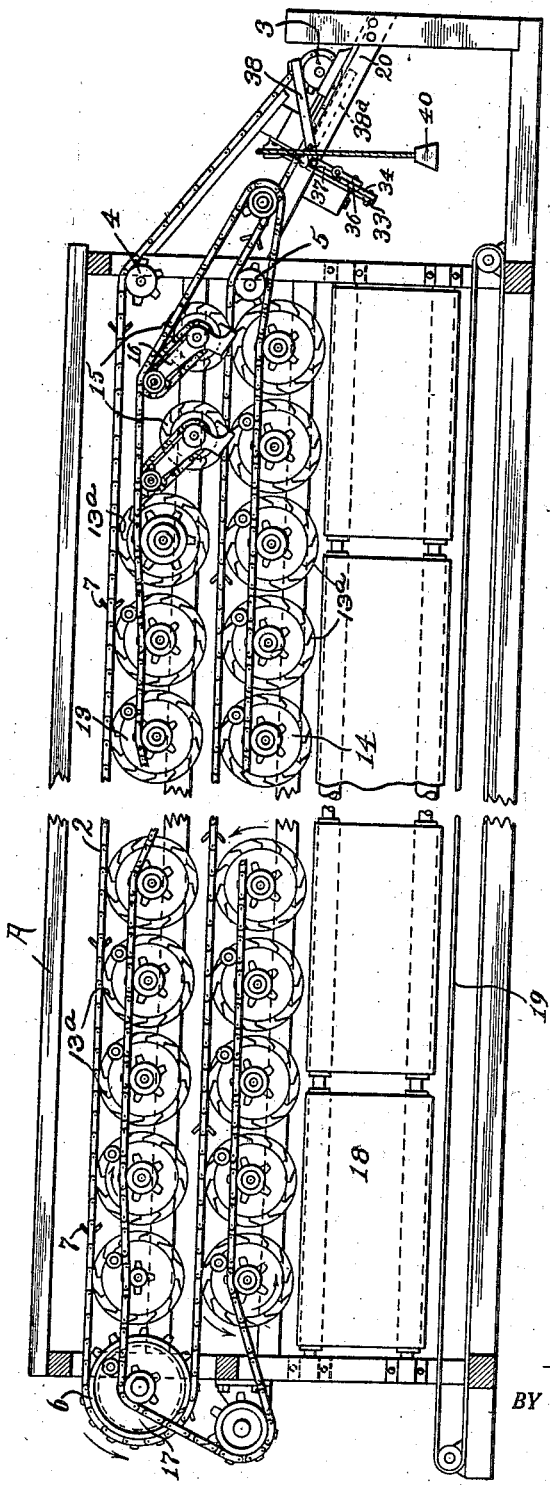

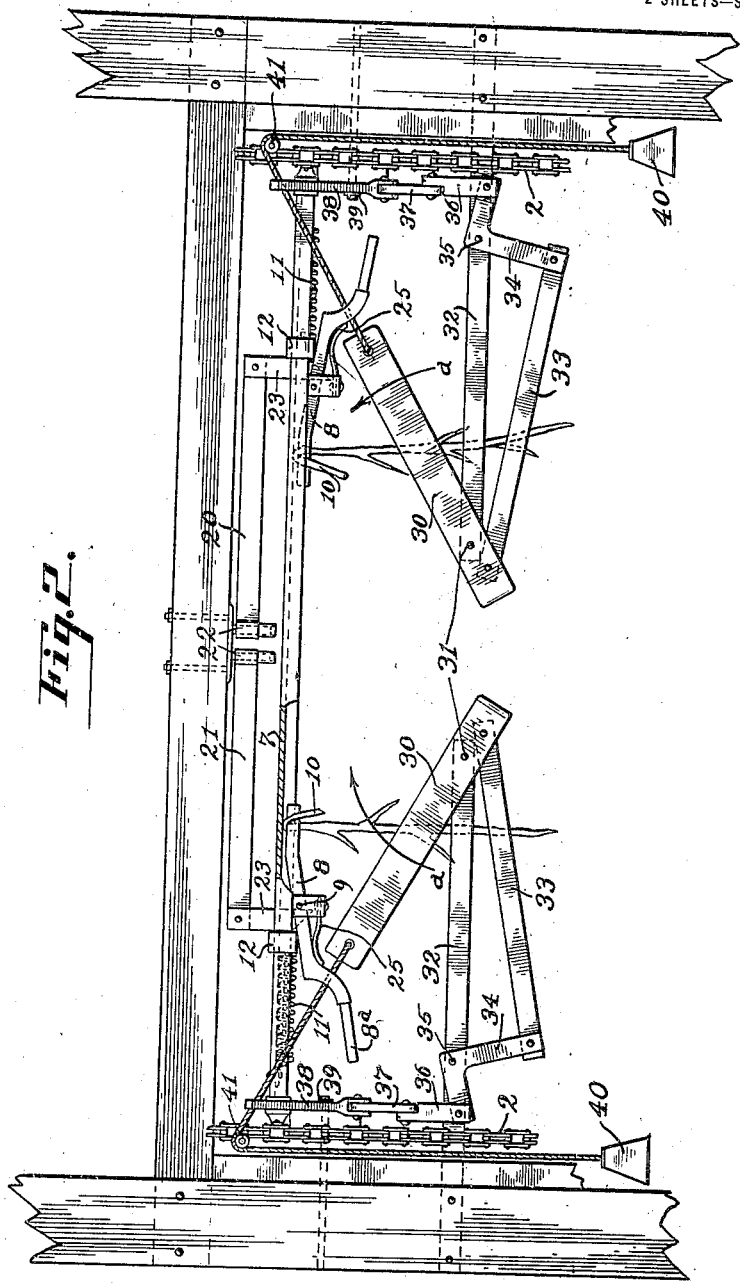

1,430,653

UNITED STATES PATENT OFFICE.

EMIL CLEMENS HORST, OF SAN FRANCISCO, CALIFORNIA.

VINE TAKE-OFF.

Application filed November 19, 1920. Serial No. 425,053.

*To all whom it may concern:*

Be it known that I, EMIL CLEMENS HORST, a citizen of the United States, residing in the city and county of San Francisco and State of California, have invented a new and useful Improvement in Vine Take-Offs, of which the following is a specification.

This invention relates to machines for picking hops, and particularly to an improvement on the structure shown in my Patent No. 1,054,119, entitled, "Apparatus for picking hops", issued February 25, 1913.

The object of the present invention is to provide a machine for picking hops, and especially to provide means for releasing and removing the hop vines when the hops have been picked therefrom.

The invention consists of the parts and the construction, combination and arrangement of parts as hereinafter more fully described and claimed, having reference to the accompanying drawings, in which—

Fig. 1 is a side elevation of a hop picking machine, showing the application of the invention.

Fig. 2 is a front view of the vine take off.

Referring to the drawings in detail, A indicates a suitable frame or supporting structure which in actual practice is from 60 to 80 feet in length, about 10 feet wide, and about 18 feet high. Mounted within the frame is an endless carrier 2, composed of a pair of spaced parallel sprocket chains travelling over suitable directing sprockets, 3, 4 and 5 at one end, and large sprocket wheels 6 at the opposite end. At suitable intervals, usually about 12 feet apart, the chains are connected by angle bars 7 provided with appropriate vine gripping devices; these gripping devices being shown as levers 8 pivoted at 9, and having one end made angular in cross section to cooperate with the angle of the bar to grip the butt of a hop vine or stalk 10. A spring 11 acts on the offset or handle end of the gripping lever 8 to normally open the grasper and the grasper is held closed upon the stalk by a sliding collar 12 mounted on the bar 7.

The butt end of a vine is inserted into the grasper and held therein by the sliding collar 12 as this collar is forced by the spring in under the handle of the lever, thereby acting as a wedge to hold the gripping end in tight contact with the vine as illustrated in Fig. 2. The carrier, consisting of the sprocket chains 2 and the connecting bars 7, whereby the vine graspers 8 are supported, travels through the machine with the vines attached thereto as shown in Fig. 2; the vines passing between revolving drums 13 and 14, and past auxiliary picking drums 15, which latter drums are mounted on swinging frames 16. The vines attached to the grasper bars are thus drawn up end first over the upper set of revolving drums 13, thence around a reversing cylinder or drum 17 and back over the lower set of revolving pickers 14, and simultaneously beneath the upper set of revolving pickers 13. The drums supporting wire pickers 13ª are all rotated in a direction opposite to the travel of the vine pulled between the same. They therefore produce a combing action when engaging the vines and thereby serve the function of engaging the hops and pulling or releasing the same with relation to the vines. The hops released by the fingers on the picking drums fall down between the drums and are deposited on separator belts 18. These belts travel in an upward direction and elevate leaves, petals, stems, etc., while the hops proper roll down the inclined belts and are finally deposited on a conveyor 19, which removes the same to any convenient point.

In actual operation the vines are cut as they hang on the trellis, about 4 feet from the ground, and laid on wagons so that all the butts point in the same direction to facilitate unloading when delivered to the machines. When a wagon reaches the machine, two operators are employed. They grasp the butt end of the vines and form a loop on the same which is hooked over the outer ends of the grasper bars. The grasper bars are then pulled by the handle sections 8ª and the collars 12 are forced inwardly by spring tension, thus securing the grasper bars in locked position when the vines have been attached. The carriers or sprocket chains 2 are maintained in constant motion when the machine is in operation and the bars 7 connecting the same and supporting the grasper bars, will thus be pulled in an upward direction pulling the vines into the machine.

The vines first pass over the upper drums 13, then over the reversing drums 17, and finally pass between the upper and lower drums 13 and 14. The vines are thoroughly combed during their travel over and between the drums and all hops are removed when the lower side of a feeding table 20 is reached. It is here necessary to release the vines from which the hops have been removed so that the grasper bars will be empty and ready to receive the new vines from the wagon. This is accomplished in the following manner:

Arranged under the feeding table is a pair of arms 21. These arms are pivotally supported at their inner ends as at 22, and their outer ends are provided with downwardly projecting fingers 23, which engage the collars 12 as each grasper bar passes by. The arms 20 swing about their pivots on an arc as they follow each grasper bar and they thereby straighten out and consequently push the collars 12 outwardly to a point where the inner flat surface of the arms 8 is disengaged. Springs 25 now come into action and cause the arms 8 to swing about their pivots to open position. The arms simultaneously move inwardly behind the collars 12 and hold these from forward projection until they are manually released by a pull on the handle sections as previously described. The automatic opening of the grasping arms 8 leaves the butt end of the picked vines free or released and actual experience shows that they generally drop off. However it happens that some vines adhere to the grasper bars and it is the purpose of the present invention to provide means for knocking them off so as to insure complete release or removal of the same. This is accomplished by providing a pair of arms 30. These arms are pivotally supported as at 31 on bracket bars 32, secured to the main frame. The ends of the arms 30 are extended beyond the pivots and are connected with links 33 and bell cranks 34. The bell cranks are also pivotally mounted on the bracket bars 32 as indicated at 35 and they are in turn connected by a pair of links 36 and 37 with rocker arms 38. These rocker arms are pivotally attached to the main frame as at 39 and are adapted to be rocked or depressed by the movement of the bars 7 as they pass over the same. By referring to Fig. 1, it will be seen that the rocker arms 38 normally assume an upwardly inclined position and that whenever a bar 7 passes the same, it rides over the arms and depresses the same in unison, causing the arms 38 to assume the dotted line position indicated at 38ª. The rocking movement thus transmitted to the arms 38 exerts a pull through the links 38 and 39, which rocks the bell cranks 35. These in turn exert a pull on the links 33 and thus transmits a swinging movement to the arms 30 in the direction of arrows $a$. The swinging movement transmitted to the arms 30 takes place when a bar 7 assumes the position shown in Fig. 2, that is, a moment after the arms 8 have been released, and as the arms 30 swing forward or together in the direction of the arrows $a$, it is obvious that they will strike the vines 10 and release and remove the same with relation to the arms 8. A continued movement of the carriers or the sprockets 2 and the bars 7 carried thereby will cause the bars to pass over the rocker arms 38 and they will then swing back to normal position due to the action of a pair of weights indicated at 40. These weights are attached to cables guided by pulleys 41 and attached to the outer ends of the arms 30; the pull exerted by the weights 40 being sufficient to restore the several arms and links to normal position where they are in readiness to remove the vines from the next bar that passes.

The entire invention involved in the present instance relates to the vine take off, or the mechanism which actuates the arms 30; the remaining mechanism, including the arms 20, being all shown and described in my previous patent referred to.

Having thus described my invention, what I claim and desire to secure by Letters Patent is—

1. A hop picking machine comprising an endless carrier, a hop vine stripping mechanism through which hop vines are drawn by the carrier, grasper bars supported by the carrier, means for securing hop vines to said grasper bars, and means for automatically and positively removing the vines from the grasper bars when the vines have completed their traverse through the stripping mechanism.

2. In a hop picking machine of the character described a main frame, an endless carrier, a series of grasper bars carried by the carrier, vine gripping and securing means on each bar, a pair of arms pivotally supported by the main frame and in the path of travel of the grasper bars, other means in the path of travel of the grasper bars for releasing the vine gripping means, and means actuated by the grasper bars for imparting a swinging movement to the arms to remove the vines with relation to the grasping means.

3. In a hop picking machine of the character described, a main frame, an endless carrier, a series of grasper bars carried by the carrier, vine gripping and securing means on each bar, a pair of arms pivotally supported by the main frame and in the path of travel of the grasper bars, other means in the path of travel of the grasper bars for releasing the vine gripping means, a pair of levers pivotally mounted, one on each side of the main frame and in the path of travel of the grasper bars, said levers adapted to be engaged and depressed by the grasper bars when they pass over the same, and a connection between said levers and the first named arms to impart a swinging movement thereto, and thereby release the vines from the gripping means.

4. In a hop picking machine of the character described, a main frame, an endless carrier therein, grasper bars carried by the carrier, a pair of gripping arms pivotally mounted on each grasper bar for securing the vines to be picked, means for tilting each gripping arm to gripping position, other means for locking the gripping arms when in gripping position, means carried by the main frame for automatically releasing said locking means to permit opening of the grasping arms, and other means for removing the vines with relation to the gripping arms when they have been opened.

5. In a hop picking machine of the character described, a main frame, an endless carrier therein, grasper bars carried by the carrier, a pair of gripping arms pivotally mounted on each grasper bar for securing the vines to be picked, means for tilting each gripping arm to gripping position, other means for locking the gripping arms when in gripping position, means carried by the main frame for automatically releasing said locking means to permit opening of the grasping arms, a pair of levers pivotally mounted one on each side of the main frame, said levers adapted to be engaged by the grasper bars and depressed by the same, a second pair of arms pivotally mounted one on each side of the main frame, and a connection between the levers and said arms for imparting a swinging movement to the arms when a grasper bar passes by and when the gripping arms are open.

In testimony whereof I have hereunto set my hand in the presence of a subscribing witness.

EMIL CLEMENS HORST.

Witness:
T. HALL.